United States Patent [19]

Nagano

[11] Patent Number: 4,854,924
[45] Date of Patent: Aug. 8, 1989

[54] COVER DEVICE FOR A DRIVING CHAIN FOR A BICYCLE

[75] Inventor: Masashi Nagano, Izumi, Japan
[73] Assignee: Shimano Industrial Company Limited, Osaka, Japan
[21] Appl. No.: 258,075
[22] Filed: Oct. 17, 1988

Related U.S. Application Data

[63] Continuation of Ser. No. 86,395, Aug. 18, 1987, abandoned.

[30] Foreign Application Priority Data

Aug. 21, 1986 [JP] Japan ............................ 61-127835[U]

[51] Int. Cl.4 .................................................. F16H 7/18
[52] U.S. Cl. ......................................... 474/140; 474/145
[58] Field of Search ........................ 474/140, 144–147; 280/152 R, 159, 160, 160.1; 180/84; 74/608

[56] References Cited

U.S. PATENT DOCUMENTS 702,775  6/1902  Catchpool ............................ 474/145
2,909,937 10/1959 Williams ........................ 474/145 X

FOREIGN PATENT DOCUMENTS 783053    7/1935  France ................................ 474/145
60-16160  6/1985  Japan .
974517   11/1964  United Kingdom .
1547124   6/1969  United Kingdom .

Primary Examiner—Thuy M. Bui
Attorney, Agent, or Firm—Stevens, Davis, Miller & Mosher

[57] ABSTRACT

A cover device for a driving chain stretched between a front chain gear and a rear chain gear of a bicycle, which is provided with a large number of first and second covers each provided with an outside cover portion for covering a space between the link plates of the chain and side cover portions in continuation of both widthwise ends of the outside cover portion for covering the side surface of each link plate. The utmost end of each of the side cover portions is bent toward the center of the width dimension of the outside cover portion to thereby form an engaging portion engageable with the widthwise edge of each link plate.

5 Claims, 3 Drawing Sheets

COVER DEVICE FOR A DRIVING CHAIN FOR A BICYCLE

This application is a continuation of application Ser. No. 086,395, filed Aug. 17, 1987, now abandoned.

FIELD OF THE INVENTION

The present invention relates to a cover device for a driving chain of a bicycle, and more particularly, to a cover device for a driving chain stretched between a front chain gear and a rear chain gear of a bicycle.

BACKGROUND OF THE INVENTION

A driving chain for a bicycle, when stretched between the front chain gear and the rear chain gear, is covered by a chain casing to prevent a cyclist's clothes from being soiled by a lubricant fed to the chain. However, the chain casing is fixed to the bicycle frame, thereby being large-scale and taking much time to mount it on the bicycle frame. A full casing for covering the entire length of the chain is complicated to assemble, and a half casing for covering only the upper half of the chain stretched between the front and rear chain gears is still subject to the risk that the chain may soil the cyclist's clothes.

In order to solve the above problem, the present inventor has invented a cover for covering the chain itself, and this invention is the subject of Japanese Utility Model Application No. Sho 60-16,160. This application was filed only, but not laid-open.

The cover device in the above-cited Japanese Patent Application forms a plurality of covers, which are fitted on the link plates of the chain so as to cover them. The cover is provided with projections each engageable with the edge of each outer link of the chain and is mounted on the chain. During testing, it has been found that the cover constructed as described above can be easily removed when subjected to an external force and one widthwise end of each link plate is exposed from the cover, whereby the problem is created in that the chain may vertically swing due to vibrations of the bicycle to hit the chain stay.

SUMMARY OF THE INVENTION

An object of the invention is to provide a cover device which can reliably be held to the chain without escaping therefrom so as to avoid a breakdown of the chain stay.

The driving chain for the bicycle to which the cover device of the invention is applied is a link chain comprising pairs of inner link plates opposite to each other and pairs of outer link plates opposite to each other. The cover device is provided with first covers covering the inner link plates and second covers covering the outer link plates. These covers each are provided with an outside cover portion covering from the outside a space between each pair of inner link plates and a space between each pair of outer link plates, and a pair of side cover portions in continuation of both widthwise sides of the outside cover portion and covering the side surfaces of the opposite link plates respectively. Each side cover portion is provided at one widthwise free end thereof with an engaging portion bent inwardly toward the center between the opposite link plates and engageable with the widthwise edge of each link plate.

The first and second covers may be different in configuration, but usually have the same configuration. The cover device is mounted on the chain by engaging each engaging portion with the widthwise edge of each link plate.

Thus, each engaging portion engages with one widthwise edge of each link plate, whereby the cover device can be mounted on the chain simply, reliably and tightly. Hence, the cover device even when subjected to an external force, is prevented from escaping from the chain.

Moreover, the engaging portion, which covers the widthwise edge of each link plate, makes contact with the chain stay even when the chain stretched between the front and rear chain gears swing a great distance. Hence, the chain stay is prevented from being damaged in comparison with direct contact of the link plate with the chain.

In addition, the cover device is formed of a material of synthetic resin, such as polypropylene, or synthetic rubber, which is lightweight, elastic and less in offensiveness and engages under elastic deformation with the link plates. Such material is used to enable the covers to be held further reliably and tightly to the chain.

The above and further objects and novel features of the invention will be more fully apparent from the following detailed description when the same is read in connection with the accompanying drawings.

DETAILED DESCRIPTION OF THE INVENTION

Figure 1:
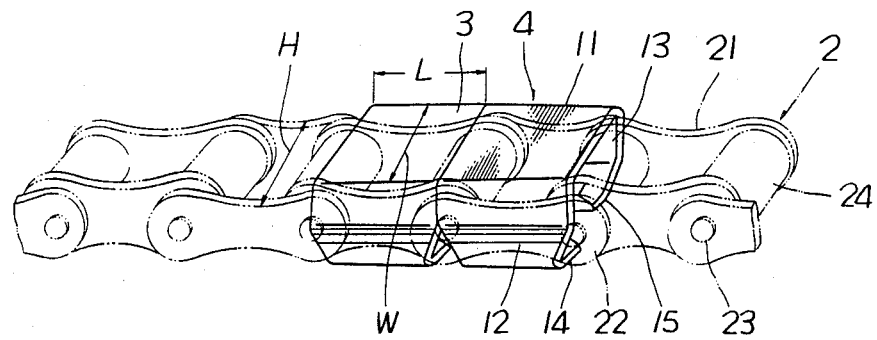
FIG. 1 is a top perspective view of an embodiment of a cover device of the invention.

As shown in the various Figures, a driving chain for the bicycle, which includes a cover device of the invention, is stretched between a front chain gear FG and a rear chain gear (not shown) and comprises pairs of opposite inner link plates 21, pairs of opposite outer link plates 22, connecting pins for rotatably connecting the pairs of link plates 21 and 22, and rollers 24 supported on the connecting pins 23 respectively.

The cover device of the invention comprises a plurality of first covers 3 for covering the pairs of the inner link plates 21 and a plurality of second covers 4 for covering the pairs of the outer link plates 22.

In addition, the first and second covers 3 and 4 may be different in configuration corresponding to the link plates to be covered, but may also be the same configuration.

In the shown embodiment, the first and second covers 3 and 4 are the same in configuration so that such same-configuration covers are hereinafter described for the convenience of description.

The covers 3 and 4 each comprise an outside cover portion 11 for covering a space between the opposite inner link plates 21 or the opposite outer link plates 22 from the outside: the upper side of the chain when transported from the rear chain gear to the front chain gear and the lower side of the same when transported vice versa; side cover portions 12 and 13 in continuation of the outside cover portion 11 and for covering the link plates 21 and 22 from both sides of the chain; and engaging portions 14 and 15 formed by bending the free edge of each side cover portion 12 or 13 inwardly toward the center between the opposite link plates 21 and 22 and engageable with one widthwise edge of each link plate 21 or 22 at the inside of the chain when transported.

Figure 2:
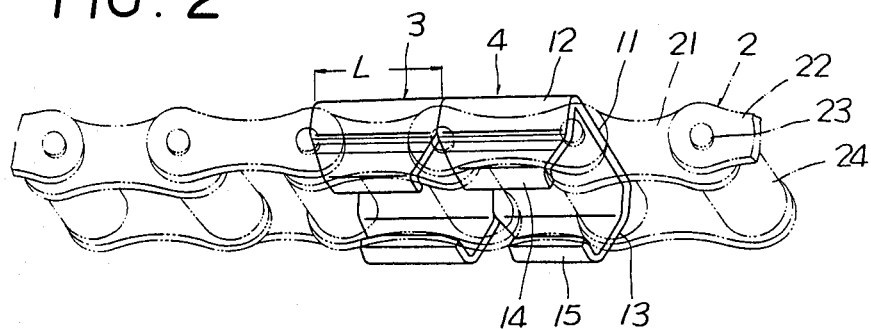
FIG. 2 is a bottom perspective view of the FIG. 1 embodiment.
Figure 3:
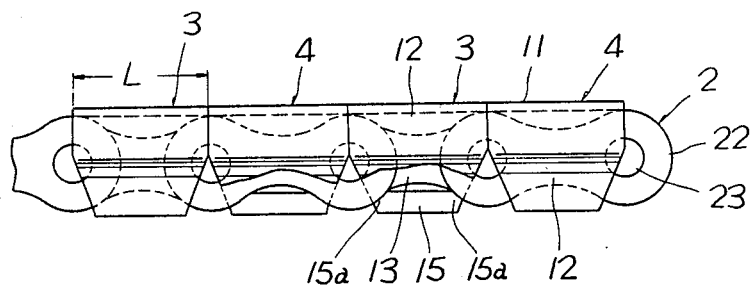
FIG. 3 is a partially cutaway front view of the FIG. 1 embodiment.
Figure 4:
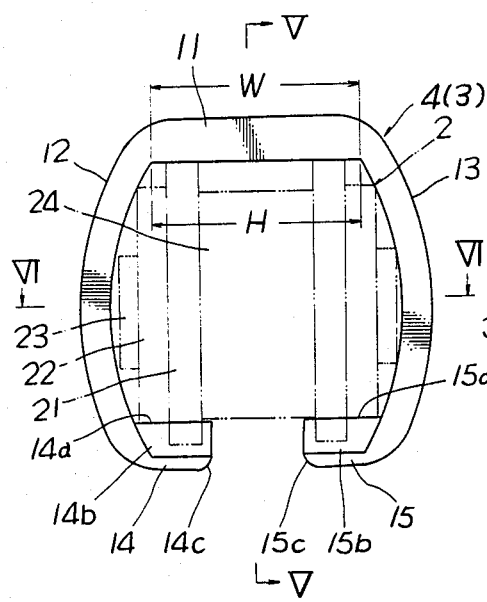
FIG. 4 is an enlarged side view of the FIG. 1 embodiment.

The covers 3 and 4 use a material preferably of synthetic resin, such as polypropylene, or synthetic rubber, which is light-weight, and less in offensiveness, and has a length L about equal to an interval between the pins (chain pitch) at each link plate 21 or 22 as shown in FIGS. 1 through 3. The outside cover portion 11 has a width W about equal to or slightly larger than an interval between the opposite outer link plates 22, and the side cover portions 12 and 13, as shown in FIG. 4, are outwardly curved to elastically engage with the link plates 21 and 22 respectively.

Figure 5:
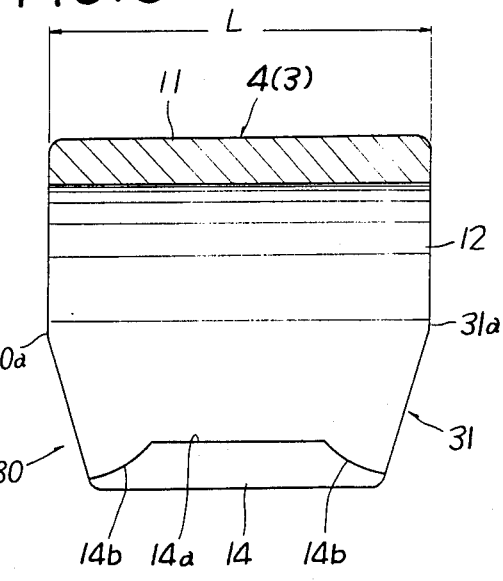
FIG. 5 is a sectional view taken on the line V-V in FIG. 4.
Figure 6:
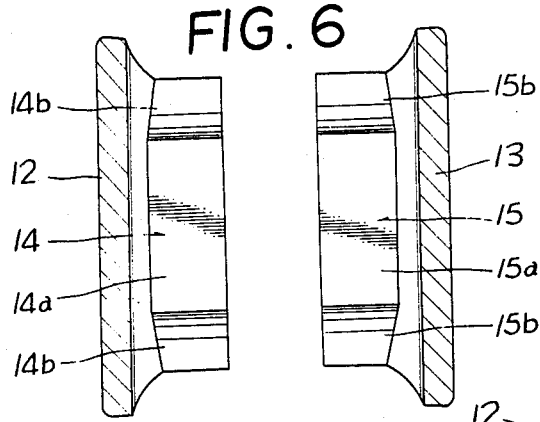
FIG. 6 is a sectional view taken on the line VI-VI in FIG. 4.

The respective side cover portions 12 and 13 are provided at both lengthwise sides with cutouts 30 and 31 allowing the chain 2 to move in a curve. The cutouts 30 and 31, as shown in FIG. 5, are formed by slantwise cutting the respective side cover portions 12 and 13 from the initial ends 30a and 31a at an intermediate portion of each side cover portion 12 or 13, in turn the line connecting the axes of pins 23, toward the lower widthwise edge of each side covering portion 12 or 13. Hence, when the chain is transported in a curve while engaging with the front or rear chain gear and the link plates 21 and 22 rotate around the pins 23, the side cover portions 12 and 13 do not interfere with each other due to cutouts 30 and 31.

Given that each link plate 21 or 22 is contracted to be narrow in a circular arc at a lengthwise intermediate portion and formed at both lengthwise end faces in a circular arc shape, according to the invention engaging portions 14 and 15 are adapted to engage with the intermediate portion and both lengthwise end faces in circular arc and are bent as described above. Curved surfaces 14b and 15b coincident with the surfaces formed in a circular arc shape at the link plates 21 and 22 are formed at both lengthwise ends of the respective surfaces 14a and 15a opposite to the widthwise edges of the link plates 21 and 22 respectively. Hence, when the covers 3 and 4 are mounted on th link plates 21 and 22, the curved portions 14b and 15b at the engaging portions 14 and 15 engage with the narrow intermediate portions and both lengthwise end faces formed in a circular arc shape, thereby restraining the covers 3 and 4 from moving lengthwise of the chain. Thus, the covers 3 and 4 are held reliably to the chain without creating a backlash.

Figure 7:
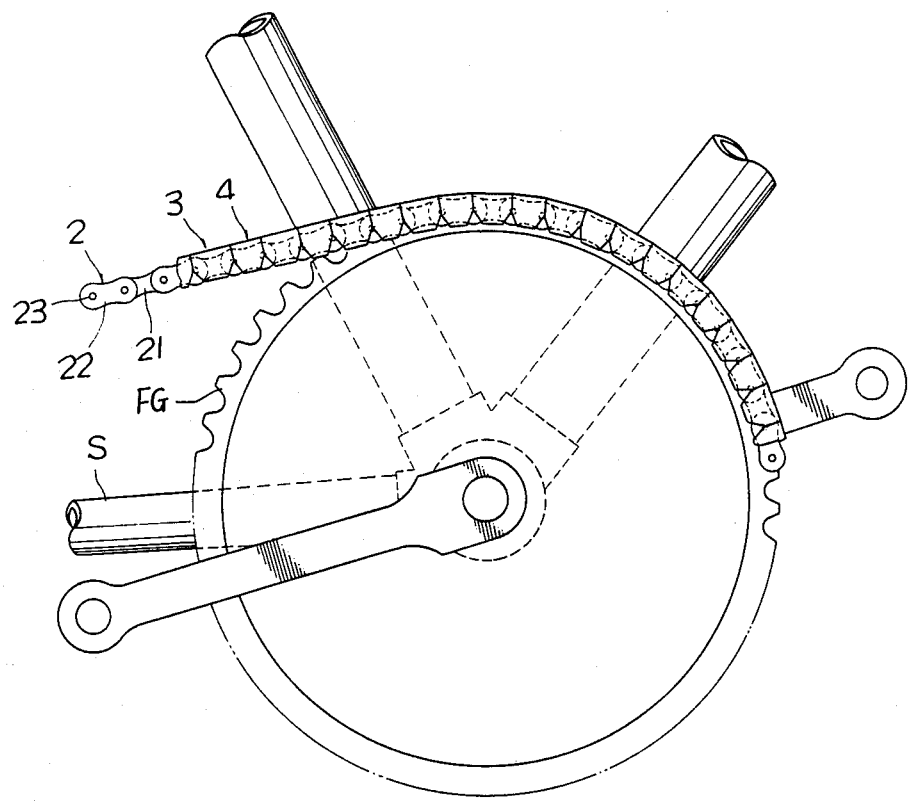
FIG. 7 is an illustration of the cover device of the invention when in use.

The covers 3 and 4 as shown in FIG. 7, are mounted on the respective link plates 21 and 22 at the chain 2, and cover the chain 2, thereby preventing the clothes of the cylist from being soiled. Also, even when the chain 2 swings largely, the engaging portions 14 and 15 contact with the chain stay S, thereby reducing a breakage thereof in comparison with direct contact with the link plates 21 and 22.

The covers 3 and 4 in engagement with the link plates 21 and 22 through the engaging portions 14 and 15, do not escape from the chain 2 during normal use even when subjected to an external force, and the engaging portions 14 and 15 engage with the narrow intermediate portions at the link plates 21 and 22, whereby the covers 3,4 are tightly held to the chain 2.

Accordingly, there is no risk that the covers 3 and 4 will shift from the chain 2 when engaging with the front or rear chain gear so as to make contact therewith to be broken, or that a backlash will occur so as to generate sounds.

Alternatively, the first and second covers 3 and 4 may be made integral and their total length may be made equal to double the interval between the respective pins, thereby being mounted on the link plate 21 or 22.

Also, the covers 3 and 4 may be single colored, but may alternatively be multicolored, whereby the multicolored covers 3 and 4 are desirably selected in combination so as to have a good appearance.

Figure 8:
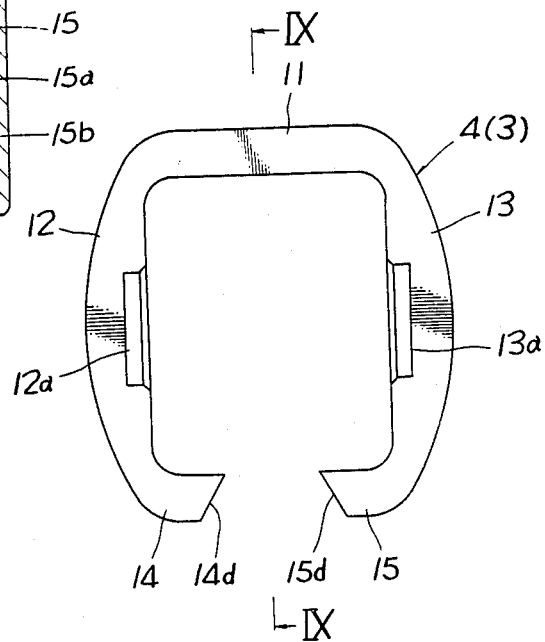
FIG. 8 is an enlarged side view of a modified embodiment of the invention.
Figure 9:
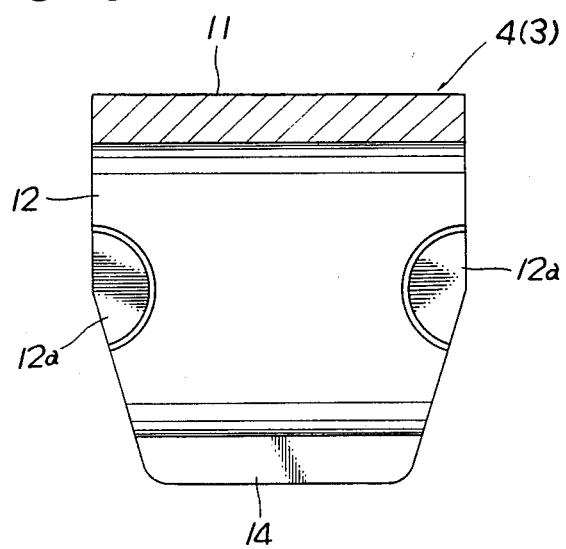
FIG. 9 is a sectional view taken on the line IX-IX in FIG. 8.

Alternatively, as shown in FIGS. 8 and 9, the inner surfaces of the side cover portions 12 and 13 may be provided at both lengthwise ends with recesses 12a and 13a formed in a circular arc shape engageable with the connecting pins 23, so that the recesses 12a and 13a may engage with the pins 23 respectively, thereby preventing the covers 3 and 4 from moving lengthwise.

Also, the covers 3 and 4 are open at the engaging side of the chain 2 with the chain gear and only the chain 2 engages therewith, in which the engaging portions 14 and 15 are provided at the utmost ends with rounded gear-guide surfaces 14c and 15c as shown in FIG. 4, or slanted gear-guide surfaces 14d and 15d as shown in FIG. 8, thereby enabling the chain 2 to be guided smoothly to engage with the chain gear.

As seen from the above, the cover comprises the outside cover portions 11 for covering the spaces between the link plates 21 and plates 22, the side cover portions 12 and 13 in continuation of the outside cover portions 11 for covering both sides of the chain, and the engaging portions 14 and 15 formed by bending the edges of side cover portions 12, 13 inwardly from the link plates and engageable with the widthwise edges thereof. Hence, the covers 3 and 4 are mounted on the chain 2 to prevent the cylist's clothes from being soiled, and the engaging portions 14 and 15 engage with the link plates 21 and 22 as described above to reliably hold the covers 3 and 4 and are positioned at the widthwise edges of link plates 21 and 22, so that even when the chain largely swings due to vibrations of the bicycle, the cover device of the invention reduces the chances of a breakdown of the chain stay.

Although the invention has been described with reference to the above embodiments, these embodiments are merely exemplary and are not to be construed as limiting the invention which is defined solely by the appended claims.

What is claimed is:

1. A cover device for a bicycle driving chain comprising a plurality of pairs of opposite inner link plates and a plurality of alternate pairs of opposite outer link plates, said cover device comprising a plurality of first covers for covering said inner link plates and a plurality of second covers for covering said outer link plates, said first covers and said second covers each including an outside cover portion for covering from the outside a space between opposite link plates and a pair of side cover portions in continuation of both widthwise sides of said outside cover portion, each of said side cover portions being provided at one widthwise free end thereof with an engaging portion bent inwardly in a bending direction adapted to be oriented toward the center of said space between opposite link plates and adapted to be engageable with a widthwise edge of said link plates, wherein a length of each of said first covers and said second covers is equal to a pitch of said link plates forming said chain and each of said side cover portions is provided with at least one cutout at at least one lengthwise end thereof, said cutout comprising means for enabling said chain to move while curving around gears of a bicycle, said outside cover portion and said side cover portions of said first covers and said second covers having a length adapted to be equal to a distance between adjacent pins connecting the link plates of the chain such that adjacent outside cover portions abut each other and adjacent side cover portions abut each other, wherein said cover device is adapted for use with said driving chain wherein each of said link plates has a lengthwise intermediate portion which includes a contracted portion formed in a circular arc shape and both lengthwise end faces of said chain are formed in a circular arc shape and wherein each of said engaging portions is provided at both lengthwise ends thereof with curved surfaces engageable with said contracted portion and both said lengthwise end faces are formed in a circular arc shape.

2. A cover device for a driving chain according to claim 1, wherein an initial portion of each of said cutouts is adapted to be positioned at a connection axis between said inner plate and said outer plate, said cutouts ending at a lengthwise intermediate portion of the widthwise edge of said side cover portions.

3. A cover device for a driving chain at according to claim 1, wherein each of said side cover portions curves outwardly.

4. A cover device for a driving chain at according to claim 1, wherein each of said side cover portions is provided with a movement restraining means for restraining said covers from lengthwise moving with respect to said chain.

5. A cover device for a driving chain according to claim 1, wherein each of said engaging portions is provided at its utmost end in said bending direction with a gear guide surface.

* * * * *